Feb. 28, 1967 E. F. WEBB 3,306,454
FLUID CONTAINER WITH CONTAMINANT-COLLECTING MEANS
Filed Sept. 24, 1962

INVENTOR.
EDMOND F. WEBB
BY
ATTORNEYS

United States Patent Office 3,306,454
Patented Feb. 28, 1967

3,306,454
FLUID CONTAINER WITH CONTAMINANT-COLLECTING MEANS
Edmond F. Webb, 25601 Franklin Hill Drive, Franklin, Mich. 48025
Filed Sept. 24, 1962, Ser. No. 225,469
6 Claims. (Cl. 210—172)

This invention relates to contaminant-collecting means for containers of fluid, particularly for fuel tanks of vehicles, to retain contaminants in the fluid and to prevent them from passing out of the container with the fluid.

The use of fuel filters in fuel lines of vehicles for removing contaminants is well known. Such filters commonly have been placed in the line between the fuel tank and the carburetor and, more recently, have been placed within the fuel tank at the inlet of the fuel supply line. Filters of this nature must be capable of removing very fine materials from the fuel in order to keep the carburetor clean and properly functioning and should also prevent flow of water from the fuel tank. The size of the particles which must be filtered out to keep the carburetor functioning properly continues to be reduced as multi-barrelled carburetors become more commonplace; these have smaller bores and passages which tend to plug more easily. However, the finer filters needed to remove the finer particles also tend to load up and plug easier.

The present invention relates to new contaminant-collecting means for a fluid container, and particularly a fuel tank, which means removes most of the contaminant particles from the fluid or fuel before they can reach and plug the fuel filter. This prolongs the life of the filter and enables the filtering action to be effective for a much longer time before enough contaminants are gathered thereon to affect the efficiency. The contaminant-collecting means of the invention comprises a layer of material affixed to the bottom of the tank, forming a multiplicity of receptacles or shelters for the recption of contaminant particles. The layer collects the particles from suspension in the fuel as it lies above and moves across the layer, with the particles settling into the receptacles in the layer where they remain, usually for the life of the fuel tank. The contaminant-collecting means also preferably includes a liquid which lays on the shelter-providing material and aids considerably in absorbing or collecting contaminants in the tank.

It is, therefore, a principal object of the invention to provide contaminant-collecting means for a fluid container to receive and retain contaminants in the fluid to prevent them from being removed from the container with the fluid.

Another object of the invention is to provide contaminant-collecting means on the bottom of a fuel tank which receives and holds contaminants from the fuel and prevents them from being gathered on and plugging a fuel filter associated with a fuel supply line in the tank.

Other objects and advantages of the invention will be apparent from the following detailed description of preferred embodiments thereof, reference being made to the accompanying drawing, in which.

Figure 1:
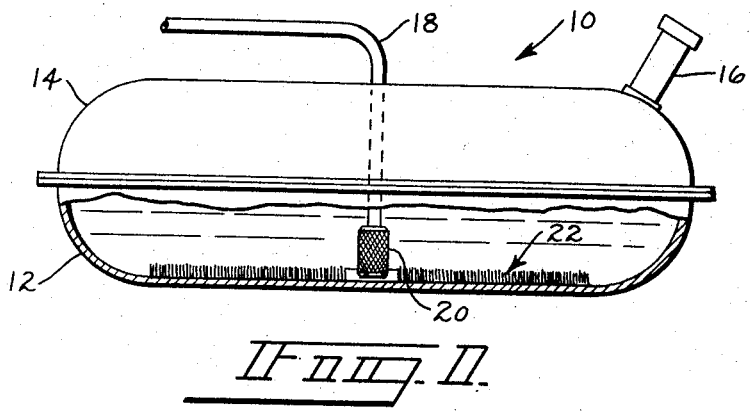
FIG. 1 is an elevational view, with parts broken away and with parts in cross section, of a fuel tank having contaminant-collecting means therein according to the principles of the invention.

While the invention is described below primarily in connection with a fuel tank, it can be used in almost any application where it is desired to remove contaminants from a fluid held in a container. As a diverse example, the invention can be applied to wine bottles to hold and prevent dregs from being raised when bottles are moved or tilted.

The invention can also be applied to other fluid systems besides fuel systems, such as hydraulic systems. Hydraulic control systems, for example, frequently employ servo valves or other components which require hydraulic fluid with a minimum amount and size of contaminant particles. Such often require the use of a nominal 5-micron or an absolute 5-micron filter which is expensive and plugs easily. To achieve a large capacity, a by-pass filter is usually used, with perhaps 80% of the hydraulic fluid flowing through the by-pass filter and 20% flowing through the main filter. By employing contaminant-collecting means according to the invention in the reservoir or sump of the system, the by-pass filter and associated piping frequently can be eliminated and a smaller main filter can sometimes be used.

Filters have long been used in fuel supply lines between the fuel tank and the fuel pump and also between the fuel pump and the carburetor to remove contaminants from the fuel. Such filters previously have removed only the larger particles in the fuel, which rarely occur, with the result that relatively few particles were caught by the filter during the life of the vehicle; consequently, there was little danger that the filter or line would become plugged.

In more recent years, the filters have been used within the fuel tank at the entrance to the fuel supply line therein. The use of the fuel filter in the fuel tank enables it to be washed by the fuel as it sloshes back and forth past the filter so that at least some of the dirt particles gathered thereon are removed. This is particularly important for fine filters which are now required to remove particles as small as approximately 10 microns or 0.0004" which can cause flooding, sticking, and clogging.

This position of the filters also has been important particularly for filters which are capable of preventing the flow of water therethrough. If such filters were used in the fuel line, they would soon block enough water to prevent the flow of fuel. However, with the filter at the inlet end of the fuel supply line, the blocked water remains in the fuel tank and eventually disappears, mainly when it sloshes upwardly on the sides of the tank, during movement of the vehicle, and evaporates. A small amount of the water also apparently goes into solution in the gasoline and is supplied to the engine therewith. In any event, the water never accumulates in the tank to the extent that it blocks the flow of fuel into the fuel supply line.

The present invention provides contaminant-collecting means comprising a layer of material affixed to the bottom of the fuel tank to catch and to retain substantially all of the contaminants in suspension in the fuel. The layer thereby provides a positive means for receiving and retaining the contaminants even before they have a chance to reach the main filter for the fuel. The contaminant-collecting layer includes a multiplicity of receptacles or shelters into which contaminant particles in the fuel settle and remain out of circulation or movement of the fuel in the tank. A substantially integral layer of material thereby gradually builds up on the contaminant-collecting layer during the life of the vehicle, which material will not go back into suspension with even the most severe jarring of the tank.

The contaminant-collecting means also preferably includes a contaminant-collecting liquid which also lies on the bottom of the tank and increases the ability of the collecting means to gather and hold contaminants. The liquid, such as glycerine and water, also may increase the attraction of the layer for water with the combination of the glycerine and water apparently collecting and holding contaminant particles more effectively than either the glycerine or water alone. The glycerine and water, in a ratio of 2 to 1, is preferably used in an amount of about four ounces per square foot of the layer. Further, only about two square feet of the layer is sufficient for a 20-gallon fuel tank, so that the increase in cost for the glycerine is negligible.

The shelter-providing layer preferably wets out and distributes the liquid when it is deposited thereon and retains it in a distributed condition on the bottom of the tank, even though only a minute amount of liquid is employed. Further, uniformity of the distribution of the liquid is achieved even though the bottom of the tank has reinforcing grooves or ridges. The layer thus provides maximum effectiveness for the liquid by exposing a maximum surface of it to the contained fluid and also substantially prevents migration of the liquid even though the tank is at an angle, if the vehicle is parked on a severe slope for a long period, for example. In addition, the layer prevents the liquid from sloshing on the sides of the tank and possibly evaporating, thereby leaving a contaminant residue which is again subject to passing through the filter.

The contaminant-collecting means, which includes the contaminant-collecting layer and the liquid, also collect gummy, gelatinous material which is sometimes formed in the fuel, at least in the case of gasoline, and which tends to plug the filters or to affect carburetor operation. This gummy material is believed to be produced from certain gasoline additives and accelerated by water and air-borne fungi. Because the fungi require water for propagation, and because any water in the tank will settle in the contaminant-collecting layer, the gelatinous growth, if any, will occur in the receptacles of the layer and be trapped therein as they grow. The contaminant-collecting layer also can be impregnated or treated with fungicide to inhibit the gelatinous growth in the first place.

Referring to the drawings, and more particularly to FIG. 1, a fluid container or fuel tank 10 includes a lower half 12 and an upper half 14 which are joined at their periphery by suitable means such as welding. The tank 10 includes a conventional filler pipe 16, through which fuel is added to the tank 10, and a fuel outlet line 18, from which fuel is removed from the tank 10 and is supplied to an engine of a vehicle which carries the tank. A fuel filter 20 is located at the opening of the fuel supply line 18 to prevent contaminants, including dirt and water, from entering the line 18. This filter can be of many suitable types including that disclosed in E. F. Webb Patent 2,788,125. In any event, the filter, as previously pointed out, is one which prevents passage of water through the line 18 and prevents passage of solid contaminants in excess of approximately 10 microns. While the filter 20 is shown within the tank 10, to provide the advantages discussed above, it can also be located at some other point in the supply line 18.

In accordance with the invention, a contaminant-collecting means constituting a layer 22 is affixed to the bottom half 12 of the tank 10 to collect contaminants in the gasoline before the contaminants have a chance to gather on the filter 20. The contaminants settle down into the layer 22 and remain there for the life of the vehicle.

Figure 2:
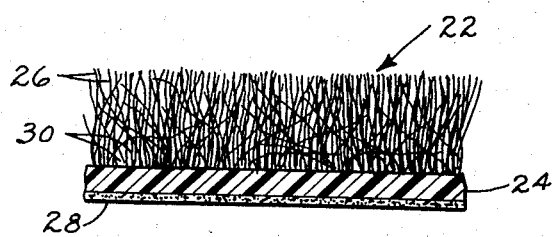
FIG. 2 is a greatly enlarged view in cross section of the contaminant-collecting layer shown in FIG. 1.

In the embodiment shown greatly enlarged in FIG. 2, the contaminant-collecting layer 22 includes a thin plastic sheet 24 which has a thickness in the order of 4 to 8 mils. A multiplicity of short, particulate fibers 26 are electrostatically flocked on an upper surface of the sheet 24 by means known in the art. The lower ends of the fibers 26 are affixed to the sheet 24 by a suitable adhesive while the fibers 26 are retained in their upright positions by the electrostatic field. Not all of the fibers remain upright, some lying at a narrow angle to the surface of the sheet 24, as shown. After the upper side of the sheet 24 is flocked, the lower side is coated with a suitable adhesive 28 and is then adhered to the bottom half 12 of the tank 10. The adhesive can be of many suitable types, many commercially-available epoxy resin adhesives being suitable for the purpose. If desired, the adhesive 28 can be sprayed on the bottom half 12 and the sheet 24 then placed in the half 12 against the adhesive or a pressure sensitive adhesive may be used. Also, the layer 22 can be affixed to the bottom half 12 of the tank 10 by mechanical engagement, such as by means of small barbs welded to the bottom half 12, which barbs engage the layer 22 when pressed thereon. The contaminant-collecting layer may also be made integral with the container.

The fibers 26 and the sheet 24 form small receptacles or shelters 30 in which the contaminants in the fuel settle and are held. After receiving contaminant particles, the receptacles 30 hold them therein out of the path of the fuel moving above the top ends of the fibers 26 when the vehicle is in motion. During extremely violent motions of the vehicle, the fuel will stir up some particles from the receptacles 30 and cause them to again go into solution. However, such occurrences are rare and in between them the contaminant particles settle and form a more or less integral substance in the receptacles 30. The slanted fibers 26 further aid in holding the contaminants near the sheet 24 in the receptacles 30.

The layer 22 is designed to have an area sufficient that even over the life of a vehicle, the contaminants in the fuel will not fill the layer 22 to any extent, so that the function of the fibers 26 and the receptacles 30 will not be seriously inhibited. In practice, if the area of the layer 22 is approximately four square feet, with fibers one-quarter inch in length, the contaminants will never become thick enough to be detrimental to the action of the layer 22.

Figure 3:
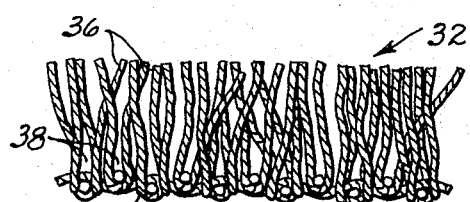
FIG. 3 is a greatly enlarged view in cross section similar to FIG. 2 of a slightly modified contaminant-collecting layer according to the invention.

A slightly modified layer 32 of a contaminant-collecting material is shown in FIG. 3. The layer 32 includes a fabric backing 34 with which is interlocked upstanding fibers 36, which may be in the form of a yarn or twisted fibers, as shown. A plurality of receptacles 38 formed by the backing 34 and the fibers 36 again constitute shelters for contaminants settling out of the gasoline. The layer 32 is affixed to the bottom half 12 of the tank 10 by adhesive or by suitable mechanical connections.

As in the case of the layer 22, the fibers 36 of the layer 32 not only help form the receptacles 38 but their upper ends tend to inhibit the flow of fuel so that the motion, if any, of the fuel in the immediate vicinity will be decreased to help enable contaminants carried thereby to settle into the receptacles 38. The fibers 36 also tend to prevent any abnormal sloshing of the fuel from stirring up the contaminants in the receptacles.

Figure 4:
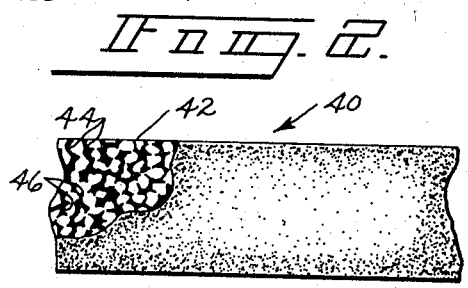
FIG. 4 is a greatly enlarged, elevational view, with parts broken away and with parts in cross section, of a further modified contaminant-collecting layer embodying the principles of the invention.

A further modified contaminant-collecting layer 40 is shown in FIG. 4. The layer 40 constitutes fine-celled foam 42 containing a multiplicity of minute, inter-communicating cells 44. The cells 44 are shown greatly enlarged with respect to the remainder of FIG. 4 in order to illustrate that they communicate with one another, which is essential for the proper functioning of the layer 40. Receptacles 46 are formed in the lower portions of the layer 40 by the cells 44, the receptacles 46 again constituting shelters for contaminants in the fuel. As contaminants in the fuel settle therefrom, they are collected by the cells 44 and gradually drift downwardly into the receptacles 46 so that they remain therein and out of circulation.

The foam layer 40 has the advantage of holding the contaminants even more effectively than the layers 22 and 32, but does not inhibit the motion of contiguous fuel since the foam layer 40 has no upstanding fingers or fibers. The foam can be of rubber or of polyurethane, for example, with a vinylidene chloride foam also being suitable, such foam being obtained from the Dow Chemical Company under the name Saran. In addition to the above three, other contaminant-collecting layers forming a multiplicity of shelters can be used, a thin honeycomb structure being an example of such.

The contaminant-collecting liquid of the collecting means must be immiscible with the contained liquid and should not freeze or vaporize at most of the temperatures to which the container is subjected. The collecting liquid should also have sufficiently low surface tension to enable it to collect contaminants and must have a specific gravity higher than that of the contained liquid to cause the collecting liquid to be at the bottom of the container and receive contaminants settling therein. In addition, in the case of a fuel tank, the liquid should not affect any water in the tank in a manner to enable it to pass through the fuel filter, by acting as a wetting agent or the like. While not essential, the collecting liquid preferably should not be miscible with the water at all. Other desirable properties of the collecting liquid include being inexpensive, immiscible in alcohol, and non-reactive with the container. The liquid, particularly if a solution, should also be hygroscopic or deliquescent in order not to be deprived of its water of solution.

By way of illustration and not limitation, substances which have been found to be suitable, in addition to glycerine, are glycol; glyceric acid; derivatives of glycerol, glyceric acids, and glycol including glycerol ether, glycol monoacetate, glycol monoformate, glycerol monoacetate, ethyl ester glyceric acid, and methyl ester glyceric acid; sodium chloride with sodium nitrite which tends to be non-corrosive and has a lower freezing point; and some hydroxides, particularly sodium hydroxide, potassium hydroxide, and lithium hydroxide. Those having a knowledge of the art can choose other suitable liquids, once they are aware of the proper characteristics discussed above.

The effectiveness of the contaminant-collecting layers has been proven in many tests. In typical tests, a layer of a contaminant-collecting material, such as shown in FIGS. 2-4 of the drawing, was placed in the bottom of a test tank which also contained a fuel supply line with a filter. The filter produced an initial pressure drop of 0.45" of mercury. The tank was shaken during the tests to simulate driving conditions and dust was added thereto at a rate of 1/16 teaspoon (0.218 gram) every minute while the fuel pump was stopped for a period of eight seconds. Without a contaminant-collecting layer at the bottom, the pressure drop produced by the filter reached 1.47" of mercury, the amount consider to be a desired maximum, when from 3½ to 4½ grams of dust had been added. However, with the contaminant-collecting layer, 14 grams of dust were added without any increase in pressure drop at all.

Various modifications of the above described embodiments of the invention will be apparent to those skilled in the art and it is to be understood that such modifications can be made without departing from the scope of the invention, if they are within the spirit and tenor of the accompanying claims.

What I claim is:

1. In a fuel tank, conduit means coupled to the tank for withdrawing fuel from the tank, a layer of cellular material affixed to the bottom of the tank and having a multiplicity of randomly disposed intercommunicating cells positioned throughout said layer, said multiplicity of randomly disposed intercommunicating cells forming a multiplicity of labyrinth-type receptacles in said material with upwardly facing openings in the top of said layer for receiving and holding contaminants from the fuel whereby dislodgement of contaminants held in said receptacles by movement of fluid in the fuel tank is minimized.

2. The combination of claim 1 in which the bottom surface of said layer of cellular material is affixed to the bottom of said tank to provide a closed bottom surface for said layer of cellular material.

3. The combination of claim 2 in which said conduit means for withdrawing fuel from the tank comprises a fuel line having an opening therein and in which a fuel filter is connected to the opening of said fuel line for filtering contaminants from fluid passing into said fuel line from said tank.

4. The combination of claim 1 in which said layer of cellular material is synthetic plastic foam material.

5. The combination of claim 1 in which the bottom surface of said layer of cellular material is adhered to the bottom of said tank by an adhesive material to thereby provide a closed bottom surface for said layer of cellular material.

6. The combination of claim 5 in which said layer of cellular material is synthetic plastic foam material.

References Cited by the Examiner

UNITED STATES PATENTS

| | | | |
|---|---|---|---|
| 1,235,438 | 7/1917 | Chynoweth | 210—172 |
| 1,315,623 | 9/1919 | Cobb | 208—188 |
| 1,822,452 | 9/1941 | Pelletier | 210—296 X |
| 2,546,874 | 3/1951 | Siegrist | 210—457 X |
| 2,788,125 | 4/1957 | Webb | 210—460 X |
| 2,923,411 | 2/1960 | Oster. | |
| 3,165,468 | 1/1965 | Strader | 210—172 |

FOREIGN PATENTS

| | | |
|---|---|---|
| 692,147 | 10/1930 | France. |
| 648,417 | 1/1951 | Great Britain. |
| 858,127 | 1/1961 | Great Britain. |

OTHER REFERENCES

Gregory: Uses and Applications of Chemicals and Related Materials, 1939, Reinhold, New York, pp. 300–302, 275, 276.

REUBEN FRIEDMAN, *Primary Examiner.*

H. L. MARTIN, *Examiner.*

F. W. MEDLEY, *Assistant Examiner.*